United States Patent
Brummer et al.

(10) Patent No.: US 9,754,602 B2
(45) Date of Patent: Sep. 5, 2017

(54) OBFUSCATED SPEECH SYNTHESIS

(75) Inventors: Johan Nikolaas Langehoven Brummer, Somerset West (ZA); Avery Maxwell Glasser, Brooklyn, NY (US); Luis Buera Rodriquez, Madrid (ES)

(73) Assignee: AGNITIO SL, Madrid (ES)

( * ) Notice: Subject to any disclaimer, the term of this patent is extended or adjusted under 35 U.S.C. 154(b) by 597 days.

(21) Appl. No.: 13/513,530

(22) PCT Filed: Dec. 2, 2009

(86) PCT No.: PCT/EP2009/008596
§ 371 (c)(1),
(2), (4) Date: Jun. 1, 2012

(87) PCT Pub. No.: WO2011/066844
PCT Pub. Date: Jun. 9, 2011

(65) Prior Publication Data
US 2012/0239406 A1  Sep. 20, 2012

(51) Int. Cl.
*G10L 21/00* (2013.01)
*G10L 17/02* (2013.01)

(52) U.S. Cl.
CPC ............. *G10L 21/00* (2013.01); *G10L 17/02* (2013.01)

(58) Field of Classification Search
CPC ........ H04K 1/02; G10K 11/175; G10K 15/02; G10L 21/00; G10L 17/02; G10L 21/003; G10L 21/0205; G10L 25/48; G10L 15/24; G10L 21/0364; G10L 13/00; G10L 13/043; G10L 13/06; G10L 13/10; G10L 15/1807; G10L 15/28; G10L 2021/0575; G10L 21/0208; G10L 17/00

USPC .... 704/264, 257, 275, 270, 270.1, 200, 231, 704/278, 203, 213, 206, 262, 219, 273, 704/226

See application file for complete search history.

(56) References Cited

U.S. PATENT DOCUMENTS 4,099,027 A * 7/1978 Whitten ................ H04K 1/06
327/277
7,184,952 B2 * 2/2007 Hillis et al. ................ 704/213
(Continued)

FOREIGN PATENT DOCUMENTS

WO  WO2004010627  *  1/2004  .............. H04K 1/00

OTHER PUBLICATIONS

Chen ("Audio Privacy: Reducing Speech Intelligibility while Preserving Environmental Sounds" ACM multimedia, Oct. 26, 2008, pp. 733-736).*

(Continued)

*Primary Examiner* — Abdelali Serrou
(74) *Attorney, Agent, or Firm* — Galvin Patent Law LLC; Brian R. Galvin

(57) ABSTRACT

The present invention relates to a method for synthesizing a speech signal; comprising obtaining a speech sequence input signal comprising semantic content corresponding to a speaker's utterance; analyzing the input speech sequence signal to obtain a first sequence of feature vectors for the input speech sequence signal; synthesizing a second sequence of feature vectors different from and based on the first sequence of feature vectors; generating an excitation signal and filtering the excitation signal based on the second sequence of feature vectors to obtain a synthesized speech signal wherein the semantic content is obfuscated.

7 Claims, 1 Drawing Sheet

(56) References Cited

U.S. PATENT DOCUMENTS

| | | | | |
|---|---|---|---|---|
| 7,240,005 | B2* | 7/2007 | Chihara | G10L 13/08 |
| | | | | 704/258 |
| 8,140,326 | B2* | 3/2012 | Chen et al. | 704/226 |
| 8,862,472 | B2* | 10/2014 | Wilfart | G10L 13/04 |
| | | | | 704/261 |
| 2004/0019479 | A1* | 1/2004 | Hillis | G10K 11/175 |
| | | | | 704/200.1 |
| 2004/0102975 | A1* | 5/2004 | Eide | 704/258 |
| 2004/0172255 | A1* | 9/2004 | Aoki | H04M 3/569 |
| | | | | 704/275 |
| 2008/0221882 | A1* | 9/2008 | Bundock | G10L 15/26 |
| | | | | 704/235 |
| 2009/0306988 | A1* | 12/2009 | Chen | H04K 1/04 |
| | | | | 704/261 |
| 2010/0161327 | A1* | 6/2010 | Chandra et al. | 704/235 |
| 2011/0010179 | A1* | 1/2011 | Naik | 704/262 |
| 2012/0136660 | A1* | 5/2012 | Harman et al. | 704/254 |

OTHER PUBLICATIONS

Verbout ("Parameter Estimating for Autoregressive Gaussian-Mixture Processes", IEEE Transactions on Signal Processing, vol. 46, Oct. 10, 1998, pp. 2744-2756 ).*

* cited by examiner

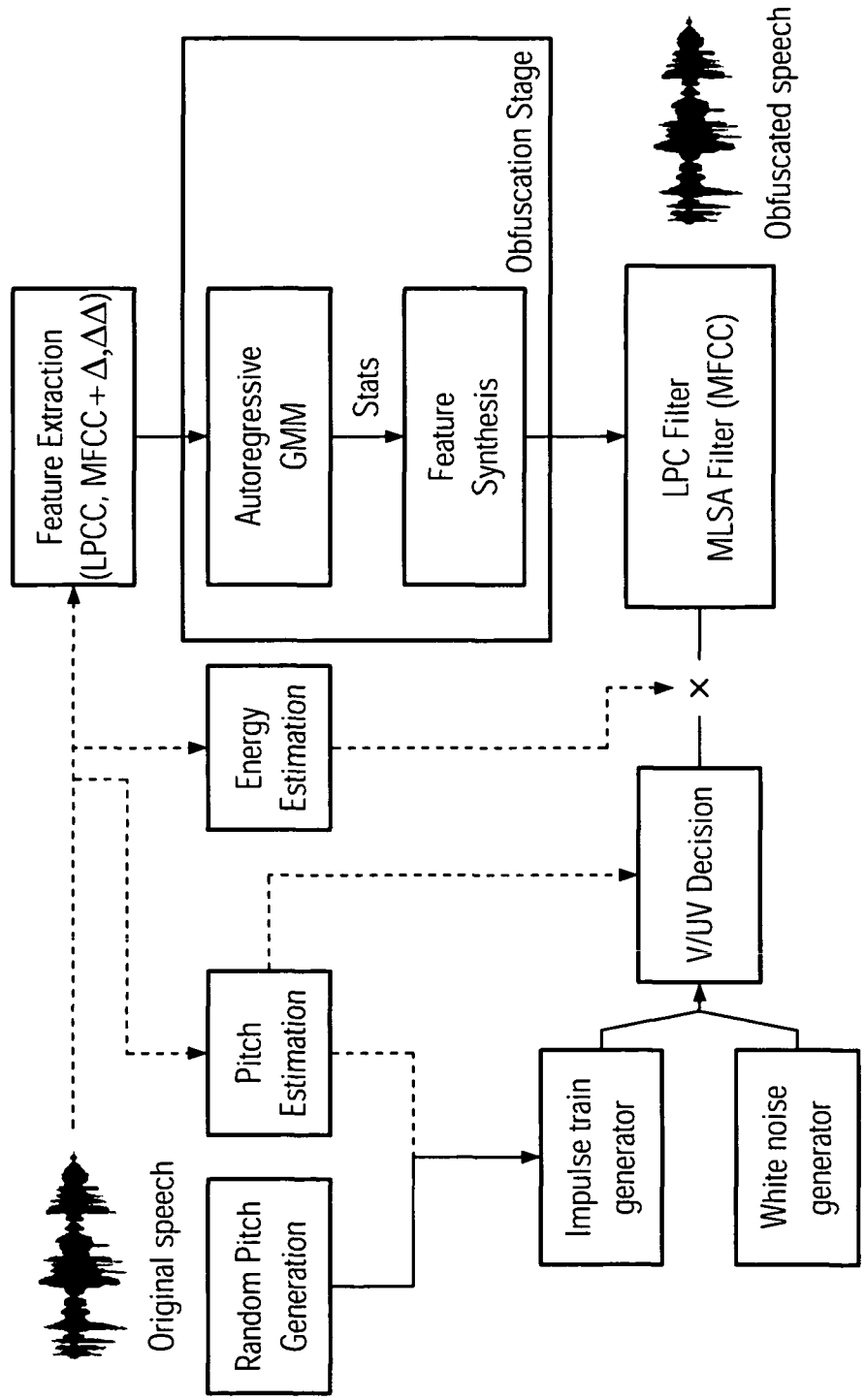

OBFUSCATED SPEECH SYNTHESIS

FIELD OF INVENTION

The present invention relates to the field of speech synthesis and, particularly, to the synthesis of detected and analyzed speech signals such that speaker information of the speech signals is maintained whereas semantic information is obfuscated.

BACKGROUND OF THE INVENTION

In the art of computer-based speech and speaker recognition, particularly speaker identification and speaker verification, the processing of speech signals includes many demanding tasks including the reliable analysis and synthesis of speech signals. Speaker recognition is of particular importance in recent voice biometric systems.

Voice biometric systems are implemented for authentication of speaker in order to allow particular service or access to data and information processing means. Speaker verification is of importance in the context of telephone banking or voice-based business in general. However, the speech signals detected during the voice-based operation by a user may contain sensitive semantic contents that shall not be transferred from one processing unit to another one. For example, it may be preferred that a processing unit designed for speaker verification or identification is not provided with the full information included in speech signals corresponding to a user's utterances. Rather, for speaker verification purposes it is sufficient to pass processed speech signals to the verification unit that include all relevant original speaker information needed for speaker recognition.

In view of the above, it is an object of the present invention to provide a method for speech synthesis wherein the synthesized speech signals include information necessary for speaker verification or speaker identification without disclosing the original semantic speech content.

DESCRIPTION OF THE INVENTION

The present invention addresses the above-mentioned need and, accordingly, provides a method for synthesizing a speech signal according to claim 1. The method comprises the steps of obtaining a speech sequence input signal comprising semantic content corresponding to a speaker's utterance;

analyzing the input speech sequence signal to obtain a first sequence of feature vectors for the input speech sequence signal;

synthesizing a second sequence of feature vectors different from and based on the first sequence of feature vectors;

generating an excitation signal; and filtering the excitation signal based on the second sequence of feature vectors to obtain a synthesized speech signal wherein the semantic content is obfuscated.

Accordingly, a speech sequence is obtained from a speaker (in form of a speech (sequence) signal) and feature vectors, e.g., comprising MEL spectrum coefficients or Linear Predictive Coefficients, are extracted. In principle, each of the feature vectors may comprise some ten or some hundred feature parameters. In conventional speech synthesis the most likely phonemes that correspond to the extracted feature vectors are determined and subsequently synthesized. Contrary, according to the present invention synthetic recovery of speech input signals maintaining the semantic contents of the input speech sequence is not an issue. Rather, the sequence of extracted feature vectors corresponding to the input speech sequence is used to synthesize a new second sequence of feature vectors.

This second sequence of feature vectors is not appropriate for recovering the verbal/semantic content of the input speech sequence but represents speaker (biometric) information necessary for speaker recognition/verification. Thus, filtering an excitation signal based on the second sequence of feature vectors results in a semantically meaningless synthesized speech signal that nevertheless reliably allows for speaker recognition/verification based on the synthesized speech signal. Therefore, the security level at the output side of the speech synthesis can be significantly lowered compared to the input side due to the obfuscated verbal content, i.e. the semantic (verbal) content of the input speech sequence is no longer intelligible in the synthesized speech signal (the synthesized speech signal is meaningless with respect to semantic content). The content information may only be passed to a unit designed for speech recognition, for example. Thereby, different security levels can be observed and the obfuscated speech signals are no longer sensitive with respect to the safety of person data. In this respect, however, it is mandatory that the original semantic speech content is not recoverable after obfuscation of the corresponding speech signals. This is achieved by the inventive method.

The excitation signal can be generated based on the obtained input speech sequence signal. In particular, the pitch and energy of the obtained input speech sequence signal can be analyzed and used to generate an excitation signal by means of sound and noise generators as known in the art. According to a less expensive approach a stochastic excitation signal may be generated and subsequently filtered based on the second sequence of feature vectors thereby at least avoiding the need for analyzing the pitch or providing it to the sound generator.

The second sequence of feature vectors can advantageously synthesized based on an autoregressive Gaussian Mixture Model. In the art, it is well-known to train Gaussian Mixture Models for particular speakers. The trained Gaussian Mixture Models allow for the determination of acoustic states corresponding to phoneme, syllables, etc. based on extracted feature vectors. Each Gaussian Mixture Model is characterized by mean vectors, covariance matrices and component weights that are uniquely determined for a particular speaker. Gaussian Mixture Models, however, suffer from the disadvantage that transitions can hardly be modeled. Only in the case that feature vectors comprising MEL cepstrum coefficients some temporal evolution from one acoustic state to another can be approximately modeled by the delta- and delta-delta coefficients.

According to embodiments of the present invention that employ an autoregressive Gaussian Mixture Model transitions from acoustic states to other acoustic states are taken into account by the use of a probability distribution of a sequence of feature vectors for a given sequence of acoustic states that is not only conditioned by the given sequence of acoustic states but also by sequences of feature vectors obtained for corresponding sequences of acoustic states in the past (for details see description of FIG. 1 below).

In some detail according to an embodiment the above-described examples for the inventive method for synthesizing a speech signal further comprises determining autoregressive Gaussian Mixture Model parameters for training speech data provided by the speaker;

determining the most likely sequence of acoustic states for the input speech sequence signal based on the autoregressive Gaussian Mixture Model;

shuffling the most likely sequence of acoustic states to obtain a shuffled sequence of acoustic states; and determining the second sequence of feature vectors as the most likely sequence of feature vectors corresponding to the shuffled sequence of acoustic states based on the determined autoregressive Gaussian Mixture Model parameters (mean vector covariance matrices, component weights). The most likely sequence of acoustic can, for example, reliably be calculated by the Viterbi algorithm in a time-saving manner.

Accordingly, a sequence of acoustic states corresponding to the input speech sequence is obtained based on the autoregressive Gaussian Mixture Model (parameters) and, subsequently, the second sequence of feature vectors is synthesized based on a shuffled sequence of acoustic states. Due to the shuffling of the states, semantic content gets lost in the synthesized speech signal generated by filtering the excitation signals based on the second sequence of feature vectors, particularly, using the second sequence of feature vectors directly for synthesizing the synthesized speech signal. Thus, it can be guaranteed that semantic content cannot be revealed from the synthesized speech signal but that nevertheless speaker recognition/verification can reliably be performed based on the synthesized speech signal.

It should be noted that according to an alternative approach a completely stochastic sequence of acoustic states may be generated and the most likely second sequence of feature vectors is determined for such a stochastic sequence of acoustic states and used for synthesis of the synthesized speech signal. In such a case, the stochastic sequence of acoustic states is determined based on Gaussian weight components determined for the autoregressive Gaussian Mixture Model.

In the above-described examples, the autoregressive Gaussian Mixture Model parameters may effectively be determined based on the assumption that the mean vectors are linear functions of past sequences of feature vectors (obtained for previous speech sequence input signals, particularly, for previous speech sequence input signals used for training the autoregressive Gaussian Mixture Model). In any case, the autoregressive Gaussian Mixture Model parameters can, in principle, be determined by the Expectation Maximization approach.

According to another advantageous example, the second sequence of feature vectors is obtained as a linear function of an expectation value (vector) for past sequences of feature vectors obtained for past sequences of acoustic states. Thereby, the second sequence of feature vectors can elegantly and quickly be synthesized saving computer resources. For details, it is again referred to the description of FIG. 1 below.

Moreover, herein it is provided a method for speaker recognition and/or speaker verification, comprising the steps of one of the above-described examples for the inventive method for synthesizing a speech signal and further comprising analyzing the synthesized speech signal wherein the semantic content is obfuscated for matching with stored templates obtained for speech utterances of the speaker.

Furthermore, it is provided a computer program product comprising one or more computer readable media having computer-executable instructions for performing steps of the method according to one of the above-described examples of the inventive method when run on a computer.

The above-described examples can be realized in a signal processing means, Thus, in order to address the above-mentioned need it is provided a speech synthesis means, comprising feature extraction means configured to extract a first sequence of feature vectors from a speech sequence input signal;

noise and sound generator configured to generate an excitation signal;

means configured to synthesize a second sequence of feature vectors based on and different from the first sequence of feature vectors; and filtering means configured to filter the excitation signal based on the second sequence of feature vectors to obtain a synthesized speech signal wherein the semantic content of the speech sequence input signal is obfuscated.

The speech synthesis means may further comprise means configured to determining the most likely sequence of acoustic states for the input speech sequence signal corresponding to the extracted first sequence of feature vectors based on an autoregressive Gaussian Mixture Model;

means configured to shuffle the most likely sequence of acoustic states to obtain a shuffled sequence of acoustic states; and means configured to determine the second sequence of feature vectors for the shuffled sequence of acoustic states based on the autoregressive Gaussian Mixture Model.

It is noted that any details and features given for the methods described above can be implemented in the speech synthesis means.

Moreover, it is provided a speaker recognition or speaker verification system comprising a database storing speech samples and/or speaker information for particular speakers;

a speech synthesis means according to one of the above-mentioned examples; and an analysis means configured to recognize or verify a particular speaker based on the synthesized speech signal and the stored speech samples and/or speaker information.

Additional features and advantages of the present invention will be described with reference to the drawing. In the description, reference is made to the accompanying FIGURE that is meant to illustrate preferred embodiments of the invention. It is understood that such embodiments do not represent the full scope of the invention.

FIG. 1 illustrates an example of the inventive method for obfuscated speech synthesis.

As it is shown in FIG. 1 according to an example of the present invention, an original speech input is processed for pitch and energy estimation. The speech input is subject to feature analysis as known in the art. The feature analysis may in general provide feature vectors comprising feature parameters corresponding to the spectral envelope, for example. Particularly, the analysis can provide Linear Predictive Coding Coefficients for an all-pole filter model of a speech signal and/or MEL frequency spectrum coefficients that can be used for modeling the speech spectrum of the speech input. Moreover, dynamic features (temporal variation of speech data from one sample frame to another) in form of delta MEL frequency coefficients and delta-delta MEL frequency coefficients ($1^{st}$ and $2^{nd}$ time-derivatives of the MEL frequency coefficients) that are conventionally used, for example, in the framework of a speech synthesis based on Hidden Markov Models, can be obtained. A feature vector can be built from the MEL frequency coefficients, the delta MEL frequency coefficients and the delta-delta MEL frequency coefficients.

The estimated pitch and estimated energy (loudness) are used to generate an excitation signal. Generation of the excitation signal is realized by means of an impulse train generator that receives the pitch information and a white noise generator. Alternatively, a random pitch generator may provide the impulse train generator with a completely random input that subsequently is used instead of the actual pitch information. A decision means switches between inputs from the impulse train generator and the white noise generator based on voiced and unvoiced passages of the input speech sequence signal, wherein the voices passages correspond to vocal chord vibration of the speaker and unvoiced passages correspond to fricatives and plosives.

As illustrated in FIG. 1 a synthesized obfuscated speech signal is generated by filtering of the generated excitation signal by a filtering means that is either a Linear Predictive Filter operating based on filter coefficients obtained from Linear Predictive Coefficients obtained by the speech analysis or an Mel Log Spectrum Approximation filter operating based on filter coefficients obtained from MEL frequency coefficients obtained by the speech analysis. The particular way of how these filter coefficients are obtained/used represents an essential feature of the present invention. Whereas in the conventional approach the feature vectors obtained by the speech analysis are used for the speech synthesis, according to the present invention a synthesized sequence of feature vectors is used for the speech synthesis, i.e., filtering of the generated excitation signal, wherein the synthesized sequence of feature vectors is generated based on the analyzed features obtained from the analysis of the original speech input. Generation of the synthesized sequence of feature vectors is achieved by the so-called obfuscation stage shown in FIG. 1.

Due to the obfuscation stage the original speech signal is not recovered but rather a new different speech signal is synthesized generated by a new synthesized sequence of the feature vectors obtained based on the analysis of the input original speech signal. However, in order to maintain speaker information that is necessary for identification/verification of the speaker associated with the original speech input constraints between static and dynamic features, dynamic information, has to be taken into account when generating the new synthesized sequence of feature vectors. For this purpose, the obfuscation stage includes a processing unit that employs an autoregressive Gaussian Mixture Model.

The autoregressive Gaussian Mixture Model used in the present invention models some dynamics of the speech and introduces the continuity that is needed in a random generative mode. A Gaussian Mixture Model is a convex combination of probability density functions and generally defined by mean vectors, covariance matrices and mixture weights (Gaussian component weights) as known in the art. In the standard maximum likelihood framework, each speaker is uniquely modeled by a particular Gaussian Mixture Model (in fact, for example, one Gaussian Mixture Model for each phoneme spoken by the particular speaker), i.e., in a training phase the feature vectors of each speaker are used to estimate his model parameters based on the maximum likelihood estimation. The basic idea is to find model parameters which maximize the likelihood of a Gaussian Mixture Model for a given set of training vectors. Maximization of the likelihood function is performed iteratively, usually, by means of the expectation maximization algorithm. Accordingly, for a given sequence of feature vectors the most likely acoustic states in terms of phonemes, syllables, etc. can be determined and synthesized in the art.

According to the present example of the inventive method autoregressive Gaussian Mixture Model parameters are determined for training speech samples obtained for a particular speaker. In the following, a particular example for training the autoregressive Gaussian Mixture Model is given in detail.

The Gaussian mixture density of a Gaussian Mixture Model can be parameterized by mean vectors, covariance matrices and mixture weights (the Gaussian Mixture Model parameters). These parameters are determined for training data under the following assumptions. The distribution of feature vectors of a given sequence of feature vectors $c_t$ obtained for a training speech signal is conditionally Gaussian with an output distribution conditioned on the actual acoustic state sequence θ (e.g., acoustic representation of spoken phoneme) and all past feature vector sequences $c_1 \ldots {}_{t-1}$ obtained for previous acoustic states. Due to this assumption, we call the employed Gaussian Mixture Model an autoregressive one. More particularly, we consider a probability distribution for a sequence of feature vectors $c_t$ of the form $$P(c_t|c_1 \ldots {}_{t-1}, \theta_t) = \mathcal{n}(c_t|\mu_\theta(c_1 \ldots {}_{t-1}), \Sigma_{\theta_1})$$

where $\mathcal{n}$ denotes the normal distribution and $\Sigma_{\theta_1}$ denotes the (state-dependent) covariance matrix.

The (state-dependent) mean vector $\mu_q$ is denoted by $$\mu_q(c_{1\ldots t-1}) = \sum_{d=1}^{D} A_q^d (f^d(c_{1\ldots t-1}) - \mu_q^d) + \mu_q^0,$$

where q ranges over states.

Thus, the mean vector $\mu_e$ is assumed to be a linear function of summarizers $f^d$ that are vector-valued functions of part feature vectors sequences. For mathematical convenience, redundant bias vectors $\mu_q^d$ for each summary and an additional bias vector $\mu_q^0$ are provided (see O. Woodland, "Hidden Markov models using vector linear prediction and discriminative output distributions", Proc. ICASSP 1992, vol. 1, pages 509-512). By $A_q^d$ a matrix for each summary and state is denoted.

According to a particular example, the summarizers may be assumed to be linear functions of the past $I_d$ feature vector sequences (corresponding to previous acoustic states):

$$f^d(c_{1\ldots t-1}) = \sum_{k=-1}^{-1} w_k c_{t+k} \text{ with weights } w_k.$$

According to the above particular example it is assumed that the output (feature vector) distribution not only depends on a sequence of states but also on past outputs corresponding to the sequence of feature vectors obtained for previous speech inputs thereby characterizing the Gaussian Mixture Model as an autoregressive one. In particular, the mean of each state is assumed to be a linear function of a vector function $f^d$ obtained based on the past output. More particularly, the vector function may by proportional to the past output(s). The proportionality factors (the weights $w_k$) may be called autoregressive coefficients and may appropriately be chosen as integers or delta function. Moreover, it is assumed that for a given state sequence θ the feature vector components are independent of each other such that the covariance matrix and the matrix $A_q^d$ become diagonal matrices $\Sigma_{qij}=\sigma^2_{qi}\delta_{ij}$ and $A_{qij}^d=a_{qi}^d\delta_{ij}$.

In order to determine $\sigma^2_{qi}$, $a_{qi}^d$ and the mean vectors the well-known expectation maximum algorithm is used. In general, the basic idea of this algorithm is to estimate a first model (parameter set) and beginning with this model to estimate a new one with a larger maximum likelihood. According to a particular example, it is recursively calculated $$\alpha_q(t) = \sum_p \alpha_p(t-1)u_q P(c_t | c_{1\ldots t-1}, \Theta_t = q)$$

$$\beta_q(t) = = \sum_r \beta_r(t+1) u_q P(c_{t+1} | c_{1\ldots t}, \Theta_{t+1} = r)$$

with $\alpha_q(t)=P(c_1\ldots{}_t, \Theta_t=q)$ and $\beta_q(t)=P(c_{t+1}\ldots{}_T | c_1\ldots{}_t, \Theta_t=q)$, where q ranges over states, and $u_q=P(\Theta_t=q)$.

The state occupancy can be calculated as $$\Upsilon_q(t) = \frac{\alpha_q(t)\beta_q(t)}{\sum_q \alpha_q(t)\beta_q(t)} \text{ and by}$$

$$\langle g \rangle_q = \frac{\sum_t \Upsilon_q(t) g(t)}{\sum_t \Upsilon_q(t)}$$

the conditional expectation of a function g with respect to occupancy of state θ is denoted.

Following M. Shannon and W. Byrne, "Autoregressive HMMs for speech recognition", ISCA 2009, 6-10 Sep., Birmingham, UK, pages 400-403, the expectation maximization re-estimations of the updated parameters (denoted by a circumflex) follow from $$\hat{\mu}_{qi}^0 = \langle c_i \rangle_q \text{ and } \hat{\mu}_{qi}^d = \langle f_i^d \rangle_d \text{ as well as}$$

$$\sum_{e=1}^D R_{qi}^{de} \hat{a}_{qi}^e = r_{qi}^d \text{ and } \hat{\sigma}_{qi}^2 = r_{qi}^0 - \sum_{d=1}^D \hat{a}_{qi}^d r_{qi}^d$$

where i ranges over feature vector components and d and e range over summarizers, and $$R_{qi}^{de} = \langle f_i^d f_i^e \rangle_q - \langle f_i^d \rangle_q \langle f_i^e \rangle_q$$

$$r_{qi}^d = \langle c_i f_i^d \rangle_q - \langle c_i \rangle_q \langle f_i^d \rangle_q$$

$$r_{qi}^0 = \langle c_i c_i \rangle_q - \langle c_i \rangle_q \langle c_i \rangle_q.$$

For example, D=3 can be chosen. The parameter $u_q$ can be re-estimated according to the expectation maximization method by $$\hat{u}_q = \sum_{t=1}^N \Upsilon_q(t)$$

It is noted that, alternatively, the parameters of the autoregressive Gaussian Mixture Model may be obtained by means of a maximum a posteriori approach in the context of a universal background model.

By means of a thus trained autoregressive Gaussian Mixture Model for a given speech input in the obfuscation stage a sequence of acoustic states, for example, corresponding to phonemes is determined that most likely matches the respective sequence of feature vectors. Determination of the sequence of acoustic states can be achieved by the conventional Viterbi algorithm, for example.

Then, the determined most likely state sequence is subject to shuffling in order to obtain a shuffled state sequence, i.e. a sequence of acoustic states (e.g., corresponding to phonemes) in an order different from the one of the most likely sequence corresponding to the original speech input. Based on the determined autoregressive Gaussian Mixture Model parameters the most likely sequence of feature vectors, for example, comprising MEL frequency spectrum coefficients, is subsequently determined for the shuffled state sequence. This newly generated most likely sequence of feature vectors is output by the obfuscation stage and used by the filtering means for filtering the generated excitation signal in order to generate a synthesized speech output with obfuscated verbal content.

Based on the above-described autoregressive Gaussian Mixture Model the sequence of feature vectors output by the obfuscation stage can be determined for the shuffled state sequence θ' by choosing a feature vector sequence c' that maximizes the output feature vector distribution $P(c|\theta')$ being a multidimensional Gaussian over vector sequences. The feature vector sequence c' for the shuffled state sequence at time t can thus be obtained by $c_t'=\mu_{\theta_t} \bar{c}_{1\ldots t-1}$, where the overbar denotes a mean feature vector sequence, i.e. the expectation value for all past feature vector sequences of the trained model.

Eventually, it is noted that according to a less elaborated but less expensive realization of the present invention with respect to time and computer resources a stochastically generated sequence of acoustic states matching analyzed feature vectors may be used for generating a new sequence of feature vectors based on the autoregressive Gaussian Model that are to be output by the obfuscation stage.

All previously discussed embodiments are not intended as limitations but serve as examples illustrating features and advantages of the invention. It is to be understood that some or all of the above described features can also be combined in different ways.

The invention claimed is:

1. A method for synthesizing a speech signal, comprising the steps of:
  obtaining a speech sequence input signal comprising semantic content corresponding to a speaker's utterance;
  analyzing the input speech sequence signal to obtain a first sequence of feature vectors for the input speech sequence signal;
  synthesizing a second sequence of feature vectors different from the first sequence of feature vectors and based on the first sequence of feature vectors, wherein the second sequence of feature vectors retains all relevant vocal characteristics suitable for speaker recognition of the speaker's voice, wherein the second sequence of feature vectors comprises no meaningful semantic information related to the input speech sequence signal;
  generating an excitation signal based on the obtained input speech sequence signal;
  obfuscating the semantic content of the synthesized speech signal by filtering the excitation signal based on the second sequence of feature vectors wherein the speaker's vocal characteristics are retained to remain suitable for speaker recognition, wherein the semantic content comprises at least a portion of morphemes uttered, and wherein the vocal characteristics comprise at least a portion of phonemes uttered;

wherein synthesizing the second sequence of feature vectors is based on:

determining autoregressive Gaussian Mixture Model parameters for training speech data provided by the speaker;

determining the most likely sequence of acoustic states for the input speech sequence signal based on the autoregressive Gaussian Mixture Model;

shuffling the most likely sequence of acoustic states to obtain a shuffled sequence of acoustic states; and determining the second sequence of feature vectors as the most likely sequence of feature vectors corresponding to the shuffled sequence of acoustic states based on the determined autoregressive Gaussian Mixture Model parameters.

2. The method according to claim 1, wherein the most likely sequence of acoustic states for the input speech sequence signal is determined by the Viterbi algorithm.

3. The method according to claim 1, wherein the autoregressive Gaussian Mixture Model parameters are determined based on the assumption that the mean vectors are linear functions of past sequences of feature vectors.

4. The method according to claim 1, wherein the autoregressive Gaussian Mixture Model parameters are determined by the Expectation Maximization approach.

5. The method according to claim 1, wherein the second sequence of feature vectors is obtained as a linear function of an expectation value of past sequences of feature vectors.

6. The method according to claim 1, wherein each of the feature vectors of the first and second sequences of feature vectors comprises MEL frequency spectrum coefficients or Linear Predictive Coefficients.

7. The method of claim 1, further comprising the step of analyzing the synthesized speech signal wherein the semantic content is obfuscated for matching with stored templates obtained for speech utterances of the speaker.

* * * * *